UNITED STATES PATENT OFFICE.

ARTHUR H. KRIEGER, OF LOS ANGELES, CALIFORNIA, ASSIGNOR TO KIESELGUHR COMPANY OF AMERICA, OF LOS ANGELES, CALIFORNIA, A CORPORATION OF CALIFORNIA.

COMPOSITION FOR PURIFYING LIQUIDS.

1,212,648.   Specification of Letters Patent.   Patented Jan. 16, 1917.

No Drawing.   Application filed September 27, 1915. Serial No. 52,822.

*To all whom it may concern:*

Be it known that I, ARTHUR H. KRIEGER, a citizen of the United States, residing at Los Angeles, in the county of Los Angeles and State of California, have invented a new and useful Composition for Purifying Liquids, of which the following is a specification.

This invention relates to composition for use in processes of purifying sugar solutions or other liquids, and is especially adapted to be used in carrying out the process described in application of F. R. Bachler, Ser. No. 11,150 filed March 1, 1915, for process of purifying liquids. The composition may, however, be used in connection with other processes or for other uses than that described in said application.

The composition constituting my invention consists of a mixture of finely divided kieselguhr or other porous absorbent carrier material and finely divided mineral colloid, preferably clay, or hydrous aluminum silicate, or other hydrous silicate or equivalent compound.

The mineral colloid which I prefer to use consists of a colloidal clay or hydrous aluminum silicate, sufficiently colloidal to enable it to remain suspended in water for the time required for the carrying out of my process as hereinafter described, when added to the water in the proportion of, say, one tenth part of clay to one hundred parts of water. Any other suitable mineral colloid may, however, be used. I also prefer to use kieselguhr as the porous inert carrier material.

My composition may consist of equal parts by weight of kieselguhr and of colloidal clay or hydrous aluminum silicate. The proportions may, however, be varied, by adding more clay or more kieselguhr to the composition, depending on the amount of impurity to be removed from the solution, or on other conditions.

The ingredients of said composition may be finely divided by grinding before they are mixed, or the raw or unground materials may be ground together, in any suitable grinding mill.

The composition may be used in purifying sugar or other solutions by adding, say, one-fifth part of the composition to one hundred parts of the solution, and then heating and adding a suitable flocculator or coagulating agent, such as an emulsion or jelly of flaxseed or cottonseed meal, as described in the application aforesaid. Or the composition may be used without the addition of any flocculating agent, in case there is sufficient flocculating agent already present in the solution to act as a coagulating or flocculating means. In order to facilitate the introduction of the composition into the solution, it may be saturated with water to form a paste or cream which is then added to the solution and stirred thereinto. The kieselguhr or porous carrier material has the effect of maintaining the openness of structure of the precipitate formed in the flocculation or coagulation, so as to enable the subsequent filtration to be carried out more effectively and readily.

By using this composition consisting of a mixture of a porous carrier (finely divided kieselguhr) and mineral colloid it is possible to introduce the colloidal material and the porous carrier simultaneously at any part of the solution, so that the flocculent precipitate is formed in the presence of the inert porous carrier and is therefore retained in open porous condition much more effectively than if it were attempted to mix the porous carrier material with the precipitate during or after flocculation. The use of this mixture also saves time in the operation.

What I claim is:

1. A composition for purifying liquids comprising a mixture of mineral colloid and a porous carrier material.

2. A composition for purifying liquids comprising a mixture of hydrous aluminum silicate and kieselguhr, both in finely divided condition.

3. A composition for purifying liquids comprising a mixture of finely divided kieselguhr and a mineral colloid.

4. A composition for purifying liquids comprising a mixture of finely divided kieselguhr and finely divided colloidal clay, in substantially equal proportions.

5. A composition of matter consisting of finely divided kieselguhr intimately mixed with finely divided colloidal clay.

6. A composition for purifying liquids comprising a mixture of finely divided kieselguhr and a colloidal material.

In testimony whereof I have hereunto set my hand, at Los Angeles, California, this 14th day of September, 1915.

ARTHUR H. KRIEGER.